Dec. 16, 1941.  A. W. MALL  2,266,226
FLEXIBLE HOSE AND METHOD OF MANUFACTURING
Filed July 13, 1939  6 Sheets-Sheet 1
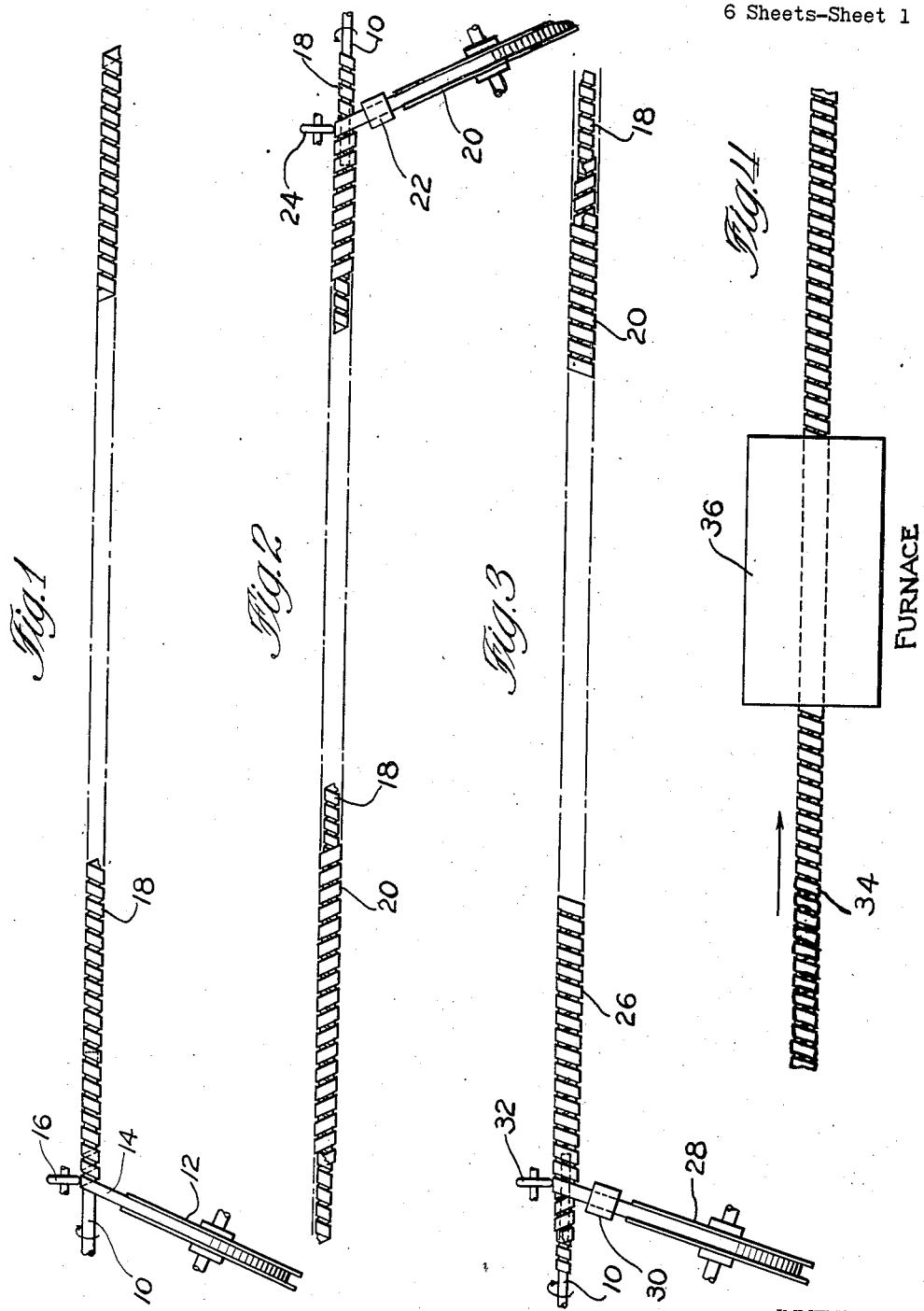
INVENTOR.
Arthur William Mall
BY
ATTORNEY.

Dec. 16, 1941.  A. W. MALL  2,266,226
FLEXIBLE HOSE AND METHOD OF MANUFACTURING
Filed July 13, 1939  6 Sheets-Sheet 2
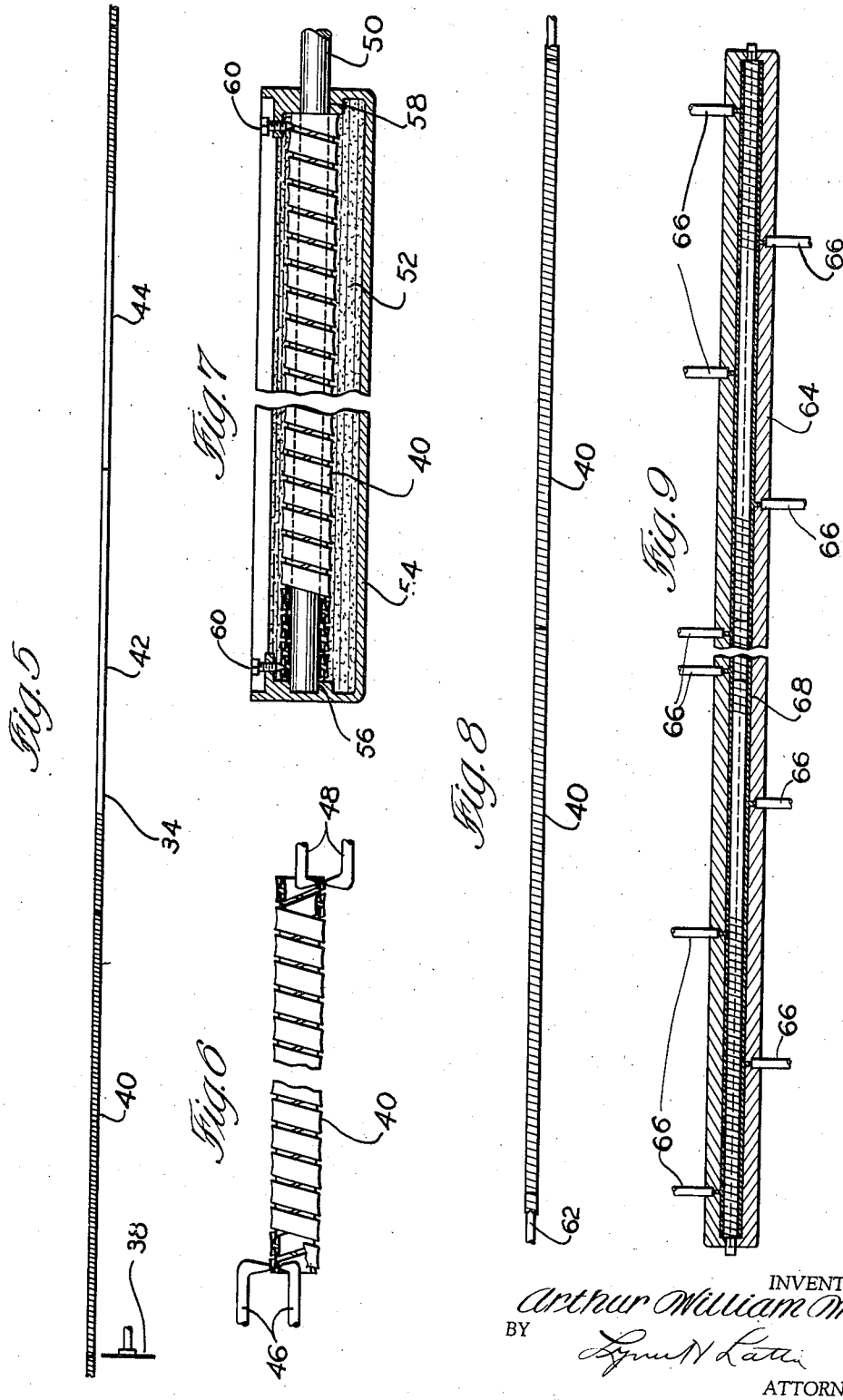
INVENTOR.
Arthur William Mall
BY
ATTORNEY.

Dec. 16, 1941.  A. W. MALL  2,266,226
FLEXIBLE HOSE AND METHOD OF MANUFACTURING
Filed July 13, 1939   6 Sheets-Sheet 3
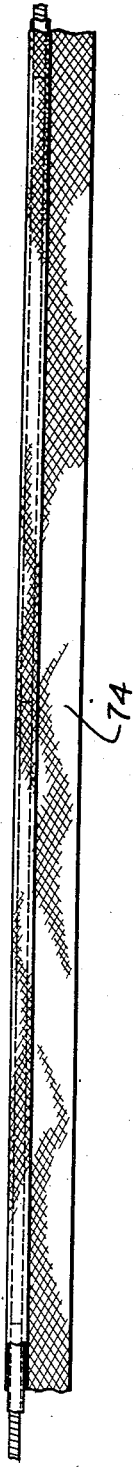
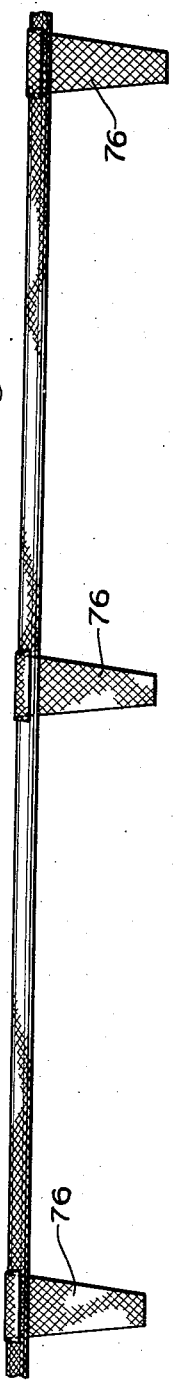
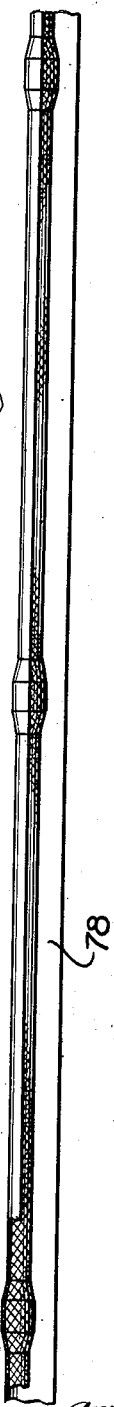
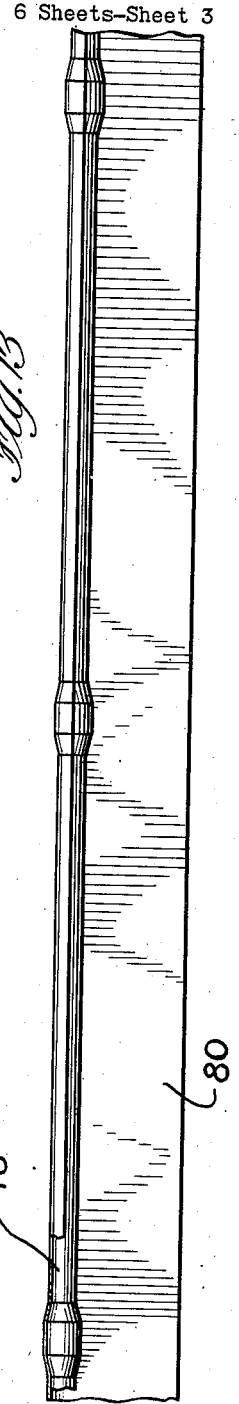
INVENTOR.
Arthur William Mall
BY
ATTORNEY.

Dec. 16, 1941.                A. W. MALL                2,266,226
            FLEXIBLE HOSE AND METHOD OF MANUFACTURING
                      Filed July 13, 1939              6 Sheets-Sheet 4
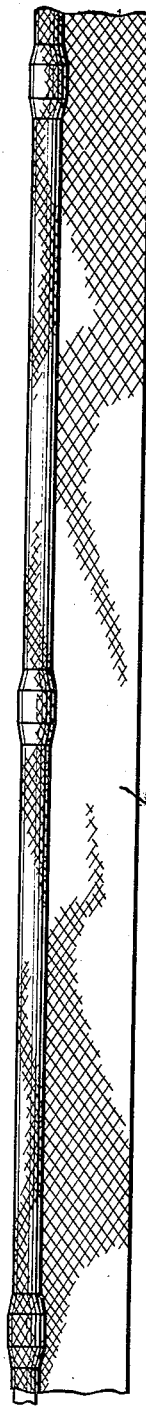
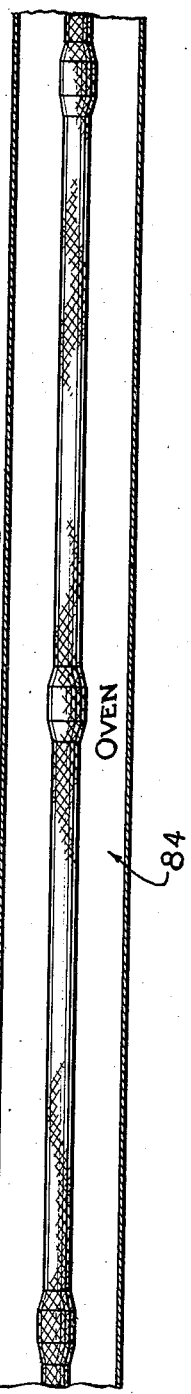
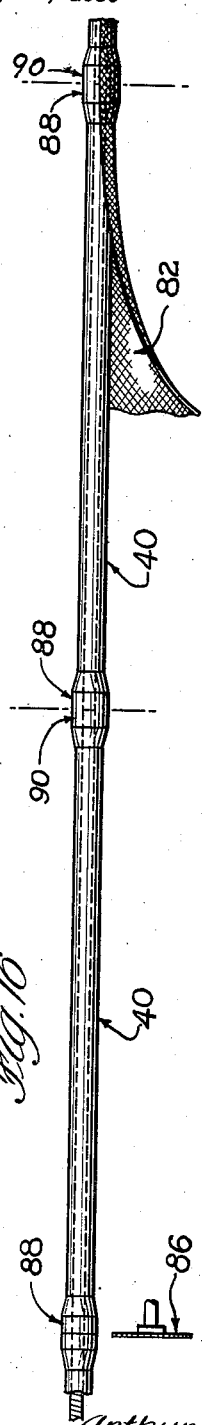
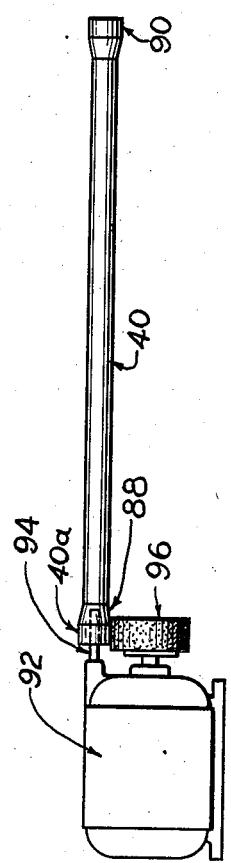
INVENTOR.
Arthur William Mall
BY
Lynn H Latta
ATTORNEY.

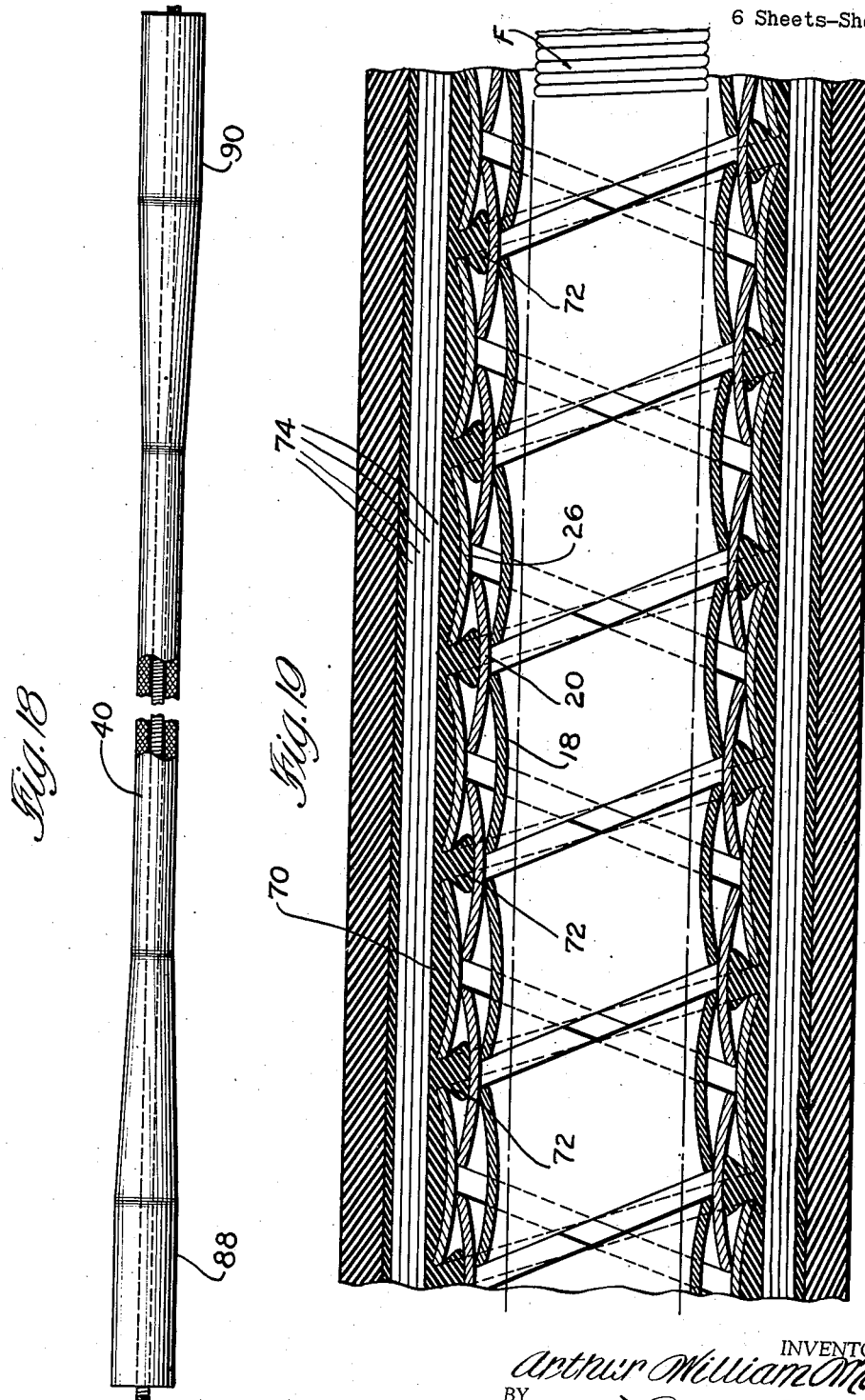

Dec. 16, 1941.                A. W. MALL                2,266,226
          FLEXIBLE HOSE AND METHOD OF MANUFACTURING
                   Filed July 13, 1939
                                              6 Sheets-Sheet 6
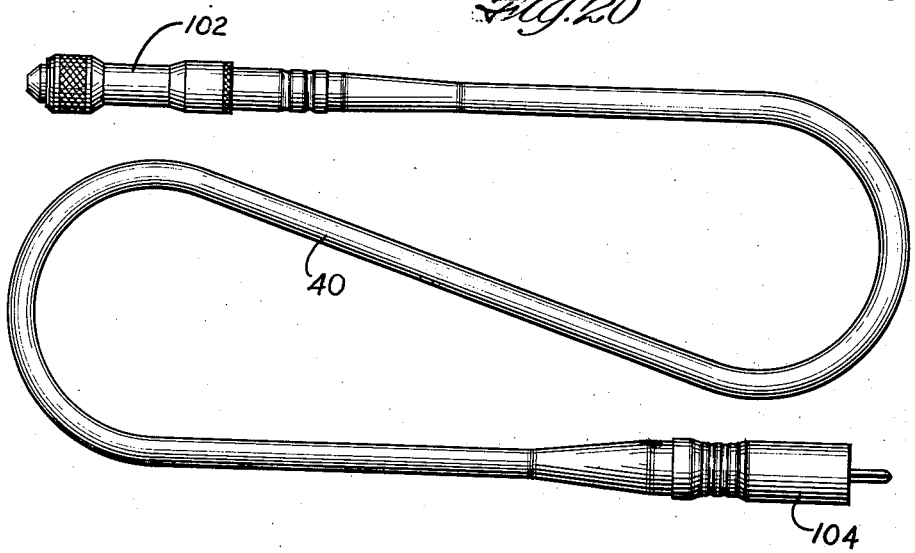
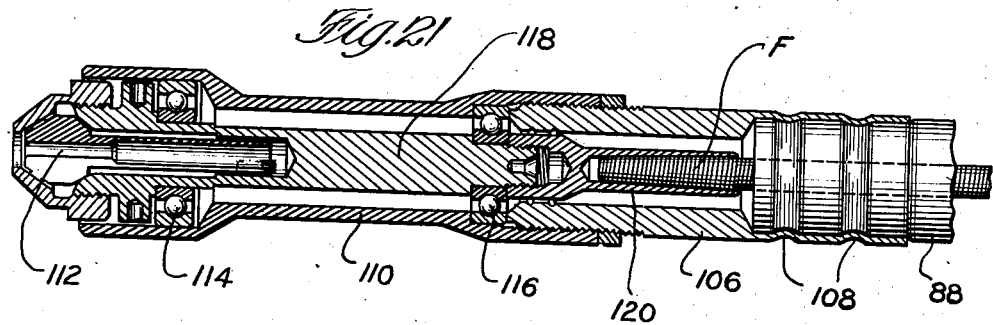
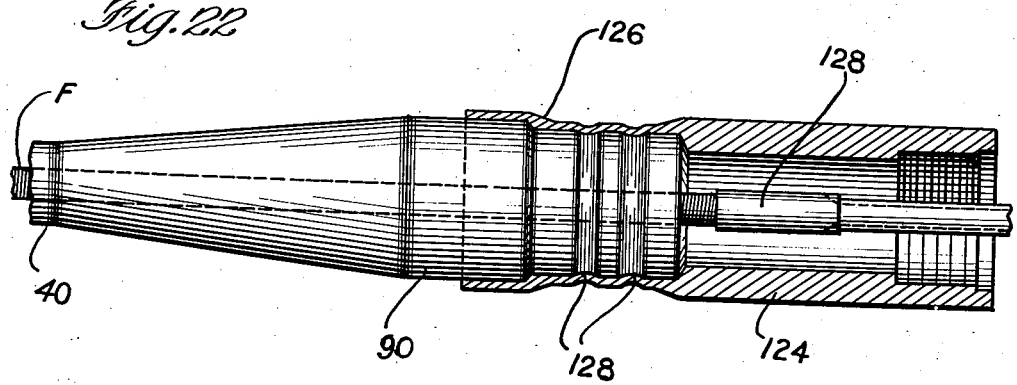
INVENTOR.
Arthur William Mall
BY
        Lynn N. Latta
                ATTORNEY.

Patented Dec. 16, 1941

2,266,226

UNITED STATES PATENT OFFICE 2,266,226

FLEXIBLE HOSE AND METHOD OF MANUFACTURING

Arthur William Mall, Chicago, Ill.

Application July 13, 1939, Serial No. 284,183

3 Claims. (Cl. 154—8)

My invention relates to flexible shaft housing and similar devices.

My invention relates more particularly to flexible shaft housing for high speed flexible shafts and to the method of manufacturing the same.

Flexible shafts of the type of the present invention usually comprise an outer relatively stationary, although flexible housing and an inner rotating and flexible driving core in the usual construction of flexible shafts on the market at the present time. The housing is of an elastic reinforced material such as a suitable rubber compound formed with embedded fibre and which ordinarily has coiled metal lining. The driving core of a flexible shaft is usually made up of a plurality of layers of wire wound one on top of the other. The wire is usually round wire and the outer layer of this round wire presents a series of ridges. These ridges engage the hard metal lines of the shaft housing and wear away quite rapidly, and this wearing away is sometimes hastened by the action of more or less sharp corners presented by the metal liner of the housing. The wear on the core or shaft occurs on the outer winding of the same and this is especially disadvantageous since this outer winding takes most of the driving stress. As a result of this wearing of the outer winding of the driving core, the life of the same is obviously foreshortened and this is one of the reasons that flexible shafts break and become out of order.

The principal object of the present invention is to provide an improved method of manufacturing flexible shaft housing and to provide a flexible shaft housing that will not be subject to the defects to be found in the flexible shaft on the open market.

Before explaining the method by which I manufacture my improved flexible shaft housing and the manner of its construction, I will explain some of the functions of the flexible shaft housing. The flexible shaft housing is at all times a bearing for the flexible shaft therein which may be revolving at slow or at high speeds. The housing of necessity must limit the amount of bend or curvature to which the flexible shaft is subjected in order to eliminate internal heat due to the strands of wire being pressed too hard against each other when being bent and revolving at the same time and being thrown against the internal bearing of the flexible shaft housing.

The amount of bending resistance in the flexible shaft housing must vary. It must have more resistance to bending near the motor or source of power to which it is attached and from which it is driven than in the center of the shaft or at the opposite end which is usually in the operator's hand and to which is connected the various tools to be driven, such as straight or angle spindles. At the hand spindle end of the flexible shaft housing there must be more resistance to bending due to the fact that the rigid spindle and ferrule give the operator a leverage which would cause a sharp bend at the end of the rigid section where the flexible part of the housing starts. To protect the flexible shaft this bend must not be too severe, but must be spread over the rest of the flexible shaft housing in a gradual manner to prevent internal friction and heating which would naturally take the temper out of the housing or outer wire in the flexible shaft and cause it to twist off.

Where the bends in the flexible shaft are too sharp and the same is revolved at a comparatively high speed it requires only a few minutes of operation to produce enough heat in the flexible shaft to draw the temper out of the wire and to cause it to twist off. A preferable construction of flexible shaft housing, therefore, must be such that its inner or bearing surface is concentric with the revolving flexible shaft. If this surface is not concentric it will cause the heating which I have mentioned with the resultant breaking of the flexible shaft.

A further object of the invention is to construct a flexible shaft housing made in such a way that the clearance between the flexible shaft and the inside of the housing will be kept at a minimum to prevent the flexible shaft from becoming corrugated in the housing when a load is put on the shaft. If the flexible shaft can become corrugated from a load it increases the internal friction and crystallization of the high carbon or music wire from which the flexible shaft is wound. Fatigue from bending is largely prevented if the clearance between the flexible shaft and the flexible shaft housing is kept within a maximum of from $\frac{1}{64}''$ to $\frac{1}{32}''$.

Another difficulty which must be overcome in flexible shaft construction is that when a heavy torsional load is put on the flexible shaft, it has a tendency to twist the flexible shaft housing. For this purpose the housing has to be made in a manner to resist this twisting action. I have further found that in order for the flexible shaft housing and the flexible shaft to have the minimum amount of friction it is necessary that the inner bearing of the housing be comprised of a hard metal helically wound ribbon, the inner bearing surface of said ribbon being highly polished and of a convex shape. The convex shape of the inner bearing surface of the ribbon permits a great reduction of the total amount of bearing surface. One of the steps in constructing my improved housing is to polish the inner surface by a lapping process.

Other steps in my improved process which will hereinafter be explained provide, when completed, a flexible shaft housing that will not have any of the weaknesses of the present commercial flexible shaft housing, as will hereinafter be explained.

In the drawings I have illustrated all of the steps whereby I construct a flexible shaft housing capable of overcoming all of the defects of the constructions today upon the market.

In the drawings, Fig. 1 is a diagrammatic view illustrating the manner in which the first inner flat spring is coiled in lengths of from five hundred to one thousand feet upon a mandrel of the required size to provide the correct diameter;

Fig. 2 is a diagrammatic view illustrating the manner in which the second inner spring is coiled in an opposite direction and under a light tension over the first inner spring;

Fig. 3 is a similar diagrammatic view illustrating the manner in which the third spring member is coiled in the same direction as the first spring and over the second spring in a direction opposite to the coils of the second spring and to a light tension;

Fig. 4 diagrammatically illustrates the manner in which the completed unit consisting of the three coiled springs wound in opposite directions over one another is passed through a continuous electric heat treating and quenching furnace;

Fig. 5 illustrates the manner in which the heat treated and hardened spring assembly is cut to five, six or seven-foot lengths as desired;

Fig. 6 is a diagrammatic view illustrating the manner in which the ends of the inner and outer liners are spot-welded together to form an integral unit of the three coiled spring members;

Fig. 7 is a diagrammatic view illustrating the manner in which the lapping of the inner surface of the inner spring member is done;

Fig. 8 is a diagrammatic view illustrating the next step in my process which consists in stringing a plurality of lengths of the spring members upon a mandrel with the ends abutting;

Fig. 9 diagrammatically illustrates the step of molding a grease proof cover in place over the inner liners;

Fig. 10 diagrammatically illustrates the manner in which several layers of rubber impregnated fabric are wound about the inner liner that has just had the grease proof cover molded in place;

Fig. 11 illustrates the manner in which the trapezoidal piece of fabric is wound on the housing to produce enlarged ends on the housing;

Fig. 12 is a diagrammatic view illustrating the placing of a tough live rubber layer about the housing;

Fig. 13 illustrates the manner in which the black rubber cover is placed about a length of flexible housing;

Fig. 14 illustrates the manner in which the fabric cover is wound about the flexible housing over the rubber cover to hold the same in place;

Fig. 15 is a diagrammatic view illustrating a section of the housing being heat treated in steam or in an electric oven;

Fig. 16 is a diagrammatic view illustrating the manner in which the outer layer of fabric is stripped off and how the flexible shaft is cut to desired lengths by cutting through the center of enlarged sections of the same;

Fig. 17 is a diagrammatic view illustrating the step of grinding the outside of the end sections of the housing concentric with the inner diameter of the first inner spring liner;

Fig. 18 is a side elevational view of a complete section of flexible shaft housing generally in proportion with parts broken away to foreshorten the view;

Fig. 19 is an enlarged longitudinal sectional view through a fragment of flexible shaft housing which has been constructed in accordance with the steps which I have discussed;

Fig. 20 is a side elevational view of a section of shaft housing showing the manner in which the tool end and the driving end are connected to the ferrules therefor;

Fig. 21 is a longitudinal sectional view through the tool end of the flexible shaft showing the manner in which the ferrule is connected to the flexible shaft and to the hand tool spindle; and Fig. 22 is a sectional view through the end of the flexible shaft and the metal ferrule attached thereto adapted to be fastened to the motor or other source of power from which the flexible shaft is driven.

In the drawings which I have chosen to illustrate the method of manufacturing my improved flexible housing, I have illustrated step by step and diagrammatically the manner in which the flexible shaft housing of my invention is constructed. Accordingly, in Fig. 1 I have shown a mandrel 10 of a given diameter which is revolved in a clockwise direction simultaneously with the feeding thereon from a spool or reel 12 of spring steel metal 14. It will be noted in Fig. 1 that as the metal is wound about the mandrel, the mandrel is continuously moved toward the left relative to coil 18 and in a manner known in the art, with the result that a coil of helically spiralled spring steel may be produced of a desired length. The roller 16 or other suitable means may be employed to restrict the diameter of the initial coiled spring member 18 to a desired size. This is accomplished by the pressure of roller 16 causing the spring steel to be bent beyond its elastic limit during the coiling process.

As I have previously mentioned, it is preferable to wind the initial or inner coil in lengths of from 500 to 1,000 feet upon the mandrel 10 of the required size to provide the correct internal diameter.

After the inner coil 18 has been wound, the winding of a second similar coiled spring member 20 may be done in a manner known in the art. The material for this winding may come from the spool 12 upon which the flat spring member may be wound, and it may pass through a tensioning device 22. A guide roller or other pressure means 24 may be utilized to assist in securing the correct desired outside diameter.

After the inner coil 18 and the second coil 20 have been wound, I next wind a third inner spring member 26 in a manner known in the art. The material for the helically coiled spring member 26 may be provided upon a reel 28 from which the same is fed through a tension device 30 to wind the same in a direction parallel to the first coil 18 and opposite to the second coil 20. A suitable pressure member 32 may be employed to keep the external diameter of the third spring member within the desired limit.

After the three coils 18, 20 and 26 respectively have been wound in opposite directions and closely engaging each other, I feed the combined liner member 32 through an electrical treating and quenching furnace 36 where the same is heat treated for the desired time and at the desired temperature to produce a liner for usual requirements.

The next step in my improved process is to string the combined liner member 34 upon a mandrel of sufficient length to accommodate the entire coiled member. I then use a cutter 38 and cut the combined liner 34 into a plurality of sections 40, 42, 44, etc. The lengths of these inner liners may be 5, 6, or 7 feet, depending upon the purpose for which they are desired. After the inner liner 34 has been cut into the sections mentioned, I take a section such as the section 40 and by means of the spot-welding devices 46 and 48 I integrally unite the ends of each unit. After this has been done the liner, composed of three strips of spring metal, is thus rigidly fastened together at its ends, forming in effect an integral liner unit.

As I have previously mentioned, unless the inner surface of the inner liner is highly polished and of a convex shape, a great amount of friction will be present for the flexible shaft. Accordingly the spring members which I have wound upon the mandrels are of a slightly convex shape so that at only one point upon each turn will a flexible shaft have any bearing. In view of the fact that on occasions the flexible shaft does actively contact the inner convex surface of the inner liner, I have found it desirable to lap the entire inner surface of the section 40. Accordingly in Fig. 7 I have illustrated the next step in my process.

This may consist of revolving a rod 50 or other suitable member inside of the spring steel liner at a very high speed while the same is submerged in a solution of oil 52. The oil may have a mixture of very fine abrasive material in the same so that the revolving rod 50 is in reality acting as a grinding unit. For the purpose of carrying out this step in my process, I may have a tank 54 formed with the end bearings 56 and 58 for the rod 50. The liner member 40 may be held in position in the tank by means of a pair of set screws 60 located at the opposite ends of the tank.

When each of the sections 40 have been lapped as above described, the next step in my process is to string a plurality of five-foot lengths of sections 40 upon a comparatively long mandrel 62 with the ends of the sections abutting. In this condition I prefer to place the mandrel 62 with a plurality of sections 40 into a mold 64 for the next operation in my process. It is desirable to hold the comparatively flat spring members 18, 20 and 26 in their actual relationship to each other and to prevent them from shifting. Accordingly (see Fig. 19) in the mold 64 I provide a plurality of sources 66 for a rubber compound which is forced into the core 68 of the mold and about the spring members 18, 20 and 26. The rubber compound 70 will thus flow freely between the spirals of the outer coil 26 and form extruded bead portions 72 which effectively prevent any longitudinal dislocation of the inner coil members among themselves.

After the housing has been treated as above mentioned by providing a grease-proof rubber cover molded in position while the same is on a mandrel, I next wrap a plurality of five-foot lengths of the partially completed housing in several layers 74 of a rubber impregnated fabric. This may be done by any simple wrapping process whereby the entire length is encircled several times to provide several layers of fabric covering.

After the partially completed housing has reached this step in the process, at each five-foot length I prefer to wind a trapezoidal strip of fabric 76. It will be noted (see Fig. 11) that this will produce at each end of the units 40 a reinforced portion for a purpose which will hereinafter be explained.

After a plurality of the units 40 have been subjected to the last step in the process, a length of the unfinished housing is next wrapped in a layer of tough live composition rubber 78. The layer 78 is comparatively thin and is adapted to be wrapped around the uncompleted housing in only one layer. After this has been done I next provide a comparatively thick and somewhat softer black rubber cover member 80 which is wrapped about the unfinished flexible housing.

The parts which I have described comprise the flexible shaft housing. However, in order to secure them in position and to subject them to the desired further treatment, I next place a length of unfinished housing in a flexible fabric wrapper 82 wound tightly about the same to securely hold all of the elements in position.

The next step in my process is to pass the flexible housing wrapped in the fabric wrapper 82, through an oven 84 in which the same is subjected to a heat treating operation to properly adhere the different sections of rubber together and generally to form of the entire outer casing of the flexible hose an integral covering.

With the flexible housing as thus constructed I next proceed to cut an indeterminate length into a plurality of sections 40. Before this is done the fabric enclosure 82 may be stripped off. In cutting the sections 40 to the desired length I employ a cutter member 86 and preferably cut medially between the ends of the trapezoidal wrapping 76 to form generally bell-shaped housings 88 and 90 at the opposite ends of each section 40. The purpose of providing the reinforced ends is to provide the most resistance against bending of the flexible shaft and the housing, both at the motor end and at the work end of the flexible shaft housing. It is obvious that at either one of these ends there is the most tendency to bend the flexible shaft and housing too sharply.

As previously mentioned, one of the principal objectives sought in manufacturing flexible shaft housing and one of the present necessities is to provide a flexible shaft housing concentric throughout with the shaft. Accordingly and to secure this result, in Fig. 17 I have illustrated the next step in my process wherein I provide a motor 92 provided with a mandrel 94 adapted to fit into the end of a section 40 of flexible shaft housing. I provide a grinding wheel 96 adapted to rotate and form the outer surface 40a of the belled portions 88 and 90 absolutely concentric with the mandrel 94, the mandrel 94 being of a diameter adapted to fit into the inner spring liner 18.

After all of the steps which I have described have been completed, a section 40 of flexible shaft housing is provided of the general shape and configuration shown in Fig. 18 with the belled ends 88 and 90. It will be noted by an examination of Fig. 19 that by means of the steps of manufacture which I have described I have provided an inner coil, a second coil and a third coil of helically wound spring material slightly convexed so that the minimum of wearing surface is exposed to a flexible shaft F. It will further be noted that the rubber cover which I originally mold over the spring liners, flows into the interstices between the edges of the metal liner, forming a seal about the liner and also providing an effective means to prevent independent lateral movement of the individual liners. The flat spring liners are in a sense keyed together, and together with the spot welding of the ends the rubber forms in effect an integral unit out of the same.

With a section 40 of flexible housing as thus provided, it is a comparatively simple matter to secure a driving spindle 102 and a motor ferrule 104 to the same.

As shown in Fig. 21, the belled end 88 of the flexible housing may be securely fastened to a ferrule 106 by indenting a pair of grooves 108 into the comparatively thin sleeve portion of the ferrule. In view of the construction of the housing previously described, the formation of the grooves will have most effect upon the internal diameter of the housing, and of more importance, the ferrule itself, by reason of the grinding operation shown in Fig. 17, will be concentric with the flexible shaft F which is extended through the housing. The ferrule 106 may be externally screw threaded to connect with a spindle shell adapted to carry at its outer end a suitable collet type chuck 112. Suitable ballbearings 114 and 116 may journal a stub shaft 118 connected to the driving member 120 of the flexible shaft F.

In Fig. 22 I have shown the manner in which the bell shaped end 90 of a section 40 of the housing may be connected to the motor ferrule 124. The motor ferrule may be provided with a comparatively thin sleeve section 126 adapted to extend over the end of the bell portion 90 of the housing and be connected thereto by forming a pair of grooves 128 in the sleeve and in the housing. In this manner the motor ferrule which is attached to the motor at the source of power may be absolutely concentric with the driving end 128 of the flexible shaft.

With the construction which I have explained and the method by which this construction is accomplished, it can be seen that I have provided a flexible shaft housing which meets all of the objectives which I have outlined as desirable in a flexible shaft housing. The construction of the metallic inner liner is such that resistance to sharp bends or curves is effectively accomplished. The work ends of a section of the housing are so constructed with the bell shaped reinforcement which I have provided that the possibility of sharp bends either at the motor end or at the work end is eliminated. The turning of the ends of the housing to form them concentric with the shaft opening therethrough prevents any disalignment of the flexible shaft in the housing, thus eliminating whipping or any tendency to torsionally turn any portion of the housing. The lapping of the flexible shaft inner liner while the same is submerged in a solution of oil and fine abrasive material, provides the least frictional bearing possible in the housing, thus adding materially to the life of the ordinary flexible shaft.

From the above and foregoing description of the process of manufacture and the article which I have provided, it will be apparent to those skilled in the art that I have provided a highly advantageous form of flexible shaft housing. I do not wish to be limited in any manner by the detailed description of either the process or the construction which I have provided; rather what I desire to secure and protect by Letters Patent of the United States is:

1. The method of manufacturing a flexible casing comprising winding a ribbon helically to form a tube, inserting a mandrel through the tube, wrapping a plurality of fabricated rubber layers over the tube, then wrapping a plurality of trapezoidal shaped rubber-like strips around the tube at predetermined intermittent intervals along the length of the tube, then wrapping an outer layer of rubber over all of the previous layers and the rubber-like strips, then subjecting the tube and wrappings to heat treatment, thereby causing the wrappings to adhere to each other so as to form a substantially integral casing, then removing the mandrel, and finally cutting through the ultimate casing into sections, by cutting through the casing in the regions where the rubber-like strips are located.

2. The method of manufacturing a flexible casing comprising winding a ribbon helically to form a tube, inserting a mandrel through the tube, wrapping a plurality of fabricated rubber layers over the tube, then wrapping a plurality of trapezoidal shaped rubber-like strips around the tube at predetermined intermittent intervals along the length of the tube, then wrapping an outer layer of rubber over all of the previous layers and the rubber-like strips, then adding a layer of fabric by wrapping, then subjecting the tube and wrappings to heat treatment thereby causing all of the wrappings, except the outer fabric wrapping, to ahere to each other, then removing the outer fabric wrapping and the mandrel, and finally cutting the ultimate casing into sections by cutting through the casing in the regions where the rubber-like strips are located.

3. The method of manufacturing a flexible casing comprising winding a ribbon helically to form a tube, wrapping a plurality of sheets of fabricated rubber-like material around the tube, then wrapping a plurality of rubber-like tapered strips around the previously wrapped sheets at predetermined spaced locations along the length of the tube, then wrapping an outer sheet of rubber-like material over all of the previous wrappings, then subjecting the tube and wrappings to heat treatment whereby the wrappings are caused to adhere to each other so as to form a substantially integral casing, and finally cutting the ultimate casing into sections, by cutting through the casing in the regions where the tapered strips are located.

ARTHUR WILLIAM MALL.